United States Patent [19]

Trowbridge et al.

[11] Patent Number: 4,839,320

[45] Date of Patent: Jun. 13, 1989

[54] METHOD FOR TREATING AND STABILIZING ZEOLITE CATALYSTS

[75] Inventors: Theodore D. Trowbridge, Madison; Shun C. Fung, Bridgewater, both of N.J.

[73] Assignee: Exxon Research & Engineering Co., Florham Park, N.J.

[21] Appl. No.: 107,211

[22] Filed: Oct. 13, 1987

[51] Int. Cl.$^4$ .......................... B01J 29/06; B01J 37/00
[52] U.S. Cl. .................................................. 502/66
[58] Field of Search ........................................ 502/66

[56] References Cited

U.S. PATENT DOCUMENTS

| | | | |
|---|---|---|---|
| 4,539,305 | 9/1985 | Wilson et al. | 502/66 |
| 4,568,656 | 2/1986 | Poeppelmeier et al. | 502/66 |
| 4,595,669 | 7/1986 | Fung et al. | 502/66 |
| 4,681,865 | 7/1987 | Katsuno et al. | 502/66 |

*Primary Examiner*—Carl F. Dees
*Attorney, Agent, or Firm*—S. H. Markowitz; T. B. Morris

[57] ABSTRACT

This invention relates to a method for treating zeolite-containing catalysts. It is particularly suitable for making catalytic compositions made up of large pore zeolites of which a large percentage of the cationic substitution sites therein contain an alkali or alkaline earth metal and further containing one or more other Group VIII noble metals and a binder. The binder preferably is formed of a particular ratio of alumina from both a sol and boehmite. The step of impregnating the zeolite with a catalytic metal may be carried out at a particular pH range so as to promote aromatics yield after later regeneration. The formed catalyst is treated with a solution of a particular pH at one or more instances either in the catalyst production procedure or after its use to stabilize the catalyst after regeneration. This catalyst is suitable for use as a reforming catalyst or in the production of benzene. The catalyst has quite high activity, selectivity, and excellent physical characteristics.

13 Claims, 1 Drawing Sheet

METHOD FOR TREATING AND STABILIZING ZEOLITE CATALYSTS

FIELD OF THE INVENTION

This invention relates to a method for treating zeolite-containing catalysts. It is particularly suitable for making catalytic compositions made up of large pore zeolites of which a large percentage of the cationic substitution sites therein contain an alkali or alkaline earth metal and further containing one or more other Group VIII noble metals and a binder. The binder preferably is formed of a particular ratio of alumina from both a sol and boehmite. The step of impregnating the zeolite with a catalytic metal may be carried out at a particular pH range so as to promote aromatics yield after later regeneration. The formed catalyst is treated with a solution of a particular pH at one or more instances either in the catalyst production procedure or after its use to stabilize the catalyst after regeneration. This catalyst is suitable for use as a reforming catalyst or in the production of benzene. The catalyst has quite high activity, selectivity, and excellent physical characteristics.

BACKGROUND OF THE INVENTION

This invention is drawn to a method for treating a catalyst used in reforming and aromatization reactions. It may be used in processes for producing reformates from naphtha streams or alternatively the process of use may entail production of aromatics such as benzenes or alkyl benzenes from a feedstock purer than straight run naphtha.

Since the advent of higher compression automobile and aircraft gasoline engines in the late 1930's and 40's, the demand for higher octane gasoline has continually risen. For the past many years, this octane requirement has been supplied by the addition of various organo lead compounds, notably tetraethyllead (TEL), or other similar compounds to mixtures of various hydrocarbons. However, because of the widespread use of catalytic converters for the removal of various undesirable components from the exhaust gases of automobiles (which converters are poisoned by the use of lead in gasoline), other methods of improving motor gasoline octane have become more important. One such method of improving the octane of straight run gasoline fractions is via the use of catalytic reforming.

Catalytic reforming is a commonly practiced process in the petroleum industry. It refers to the treatment of various naphtha fractions to improve their octane rating via their conversion to aromatics. The more important hydrocarbon reactions occurring during the reforming operation include the dehydrocyclization of linear alkanes to aromatics, the dehydrogenation of cycloalkanes to aromatics, and the dehydroisomerization of alkylcyclopentanes to aromatics. A number of other reactions also occur, such as the isomerization of paraffins and the hydrocracking of various hydrocarbons to produce lighter gaseous products. Hydrocracking reactions are generally to be minimized during reforming in that they decrease the yield of the more valuable aromatics and produce hydrocarbons of lower economic value such as methane, ethane and propane.

The production of benzene or alkylbenzenes from linear or branched alkanes is an important process in the chemical industry. Benzene, toluene and the various xylenes form the bases for many polymerization processes. Yield of products and selectivity to the proper products are the major concerns in processes for producing these commodity chemicals. Major by products in the dehydrocyclization of alkanes include those also found in the reforming processes discussed above, e.g., light gases such as methane, ethane and propane.

Catalysts which are suitable for reforming processes must possess a wide variety of chemical and physical characteristics. The catalyst must be able to produce highly aromatic liquid products in high yields. In reforming, the aromatic hydrocarbons must be produced in concentrations suitable for blending to high octane motor fuels. The catalyst should produce low yields of lighter gaseous hydrocarbons. The catalyst should have high activity and should be regenerable with relative ease as time goes on. The catalyst should be fairly strong, i.e., possess good crush strength, and have a high attrition resistance. Thus, the catalyst may be loaded into reaction vessels with a minimal loss of catalyst macrostructure to physical breakage. The catalyst should be of a form which may be cheaply manufactured.

Catalysts containing platinum, with or without the addition of other promoter metals such as rhenium, have been used for some time. These metals are often supported on alumina or silica-alumina. The benzene and alkyl-benzene products are among the most important of those produced by the catalytic reforming process in that they have the highest octane number when used in motor fuel.

Additionally, platinum based catalysts have been used in the dehydrocyclization of hexane and heptane to produce benzene and alkyl benzenes having utility in the chemical industry. Various catalysts have been suggested for use in the reforming process and include those mentioned above as well as catalysts based on the use of the Group VIII noble metals on zeolites.

Although zeolite L catalysts, usually in their hydrogen form, have been employed as catalytic dewaxing catalysts and in other applications, they are particularly useful in reforming because they decrease the amount of hydrocracking which occurs during reforming. For example, U.S. Pat. No. 4,104,320 to Bernard et al. discloses that the use of zeolite L as a support increases the selectivity of the reaction for producing aromatic products. This improvement, however, has been made at the expense of catalyst life. This catalyst may be regenerated by subjecting it to the hydrogen treatment, oxidation, oxychlorination, calcining, water treatment, and reduction of hydrogen as disclosed in French patent application No. 2,360,540, filed Sept. 9, 1981 to Bernard et al., or by hydrogen regeneration as is disclosed in French patent application No. 8,000,144 to Bernard.

Reforming/dehydrocyclization catalysts of the platinum-KL type have been disclosed in U.S. Pat. Nos. 4,522.856, to Tauster et al.; 4,595,670 to Tauster et al., 4,595,668 to Poeppelmeier et al., 4,595,669 to Fung et al. U.S. Pat. No. 4,595,669 in particular, discloses a bound reforming/dehydrocyclization catalyst comprising platinum or other Group VIII noble metal on a type L zeolite which preferably is of the potassium form. None of the publications show an extrudate having the physical and chemical properties disclosed an claimed herein, however.

Alumina is known as a binder to support type L zeolites in producing a reforming catalyst. For instance, U.S. Pat. No. 4,458,025 (to Lee et al.), U.S. Pat. No.

4,517,306 to Buss and its divisional U.S. Pat. No. 4,447,316 (both make such as suggestion). Lee et al. suggests extrusion of a type L zeolite in alumina. The U.S. patent application having Ser. No. 880,087 (to Trowbridge) suggests a process for extruding a type L zeolite catalyst using a combination of alumina derived both from boehmite and a sol. None of the patents suggests the benefits accruing from the use of the process disclosed herein.

Other disclosures which may be relevant to the invention include Gladrow et al. (U.S. Pat. No. 3,326,818) which discloses a catalyst composition made up of a crystalline aluminosilicate and a binder prepared by mixing the crystalline aluminosilicate in a minor amount of dry inorganic gel binding agent, such as alumina containing a minor amount of a peptizing agent. The peptizing agent was said to enhance the strength of the resulting product.

The patent to Young et al. (U.S. Pat. No. 3,557,024) discloses alumina bonded catalysts which are to be used in hydrocracking processes. The catalyst composition is formed by mixing one of a number of zeolites, including zeolite L, with a binder consisting of hydrous boehmitic alumina acidified with at least 0.5 mole equivalent of a strong acid per mole of alumina. A catalyst having enhanced strength is said thus to be formed. The U.S. patent to Mitsche et al. (U.S. Pat. No. 4,046,713) suggests a method for preparing an extruded catalyst composition and acidic alumina hydrosol is admixed with a dry mixture consisting essentially of a finely divided alumina, preferably a hydrate, and a finely divided crystalline aluminosilicate such as mordenite. The resulting mixture is extruded, dried and calcined to form a catalyst said to be useful in the reforming of various naphthas.

Several patents to Johnson or Johnson et al. (U.S. Pat. Nos. 4,305,810; 4,305,811; 4.306,963; and 4,311,582) are directed to stabilized reforming catalysts which are halide promoted. Each of the catalysts is produced by employing a modified alumina support whose alumina precursor comprises at least about 75% by weight boehmite.

After the zeolite-binder mixture is formed into a shape suitable for use in a reactor, the catalytic metal must then be introduced into the zeolite.

The two generally known methods of loading Group VIII metals into a zeolite carrier using an aqueous metal solution are the impregnation and ion exchange techniques. The impregnation technique of loading a zeolite carrier generally involves loading with an amount of cationic metal solution having a volume only sufficient to fill the total pore volume of the carrier to incipient wetness (saturation). In contrast, the ion-exchange technique involves loading the metal onto a zeolite carrier with an amount of cationic solution in excess of that needed to fill the total pore volume of the carrier to incipient wetness. The excess solution is stirred with or circulated through the bed of zeolite particles. In each cases there is a rapid decrease in Group VIII metal concentration to a minimum and an equivalent increase of the non-Group VIII metal cations in solution due to the ability of the zeolite to incorporate other cations vis ion-exchange with the non-framework metal ions of the zeolite. Completion of the catalyst preparation generally involves drying and calcining the solids.

In the impregnation techniques, the solids are dried and calcined directly, whereas in the case of the ion-exchange technique the excess liquid is removed from the solids prior to drying and calcination. As is shown in U.S. Pat. No. 4,104,320, the ion exchange process may result in the production of residual acidity when, during the subsequent reduction of the Group VIII metal cations (which are at near-atomic dispersion inside the zeolite channels) hydrogen ions are formed in order to maintain charge neutrality of the zeolite structure. The acidity occurs because a large fraction of the non-framework cations that were displaced by cations during loading is removed in the discarded excess liquid prior to drying and calcination. Subsequently, when the Group VIII metal is reduced using hydrogen-containing reducing agents, these cations are no longer available to displace protons from these sites. The formation of acid sites is not a problem with the impregnation technique since the displaced ion will remain on the carrier so that when the Group VIII metal is subsequently reduced the original displaced ion can replace the proton on these sites.

U.S. Pat. No. 4,416,806 also is said to disclose the depositing of platinum on a zeolite L carrier by impregnation and exchange of ions. Also disclosed is that the carrier is immersed in a solution containing platinum for a period of time, washed and dried, and that ion exchange and impregnation may be carried out in the presence of an excess of salt of the cation of the zeolite; for instance, potassium chloride for the KL Zeolite. In U.S. Pat. No. 3,226,339 an aluminosilicate zeolite is contacted with a solution of an ionizable platinum compound and an ionizable non-platinum metal salt for a sufficient period of time said to effect uniform distribution of the platinum ion on the zeolite. While both of these patents discuss the presence of an excess of a metal salt, there is no disclosure of the particular process which is necessary to prevent acid site generation upon the drying calcination and reduction of the zeolite carrier while avoiding an excess of metal ions in the form of a salt which could block the passage of hydrocarbons through the pores of the zeolite carrier.

In U.S. Pat. No. 3,775,502 zeolite X is mixed in an ion exchange procedure with a platinum salt and a sodium salt for several hours. Thereafter, the catalyst is washed thoroughly to remove the salt residue and then dried. Excessive water washing at this stage can cause other undesirable reactions, such as the loss of platinum from the carrier and incorporation of acidity into the carrier. Upon reduction the catalyst is given a final treatment of aqueous sodium bicarbonate salt to convert the H+ zeolite sites which have been created (also see U.S. Pat. No. 3,953,365).

In U.S. Pat. No. 4,552,856 to Tauster et al., a process for loading platinum onto a zeolite is described. The process involves the drying of the zeolite (with or without a binder) and introducing the zeolite to a solution of the catalytic metal. The catalytic metal solution is present in such an amount that all of the solution is subsumed. The product is then dried and calcined.

In U.S. Pat. No. 4,568,656, the composition of the platinum-containing solution used to load a zeolite powder or bound zeolite substrate so to maintain a particular defined concentration of a non-platinum metal within a functionally defined range. The pH of the solution is said to be "at least 7, preferably 8.5 to 12.5".

In U.S. Pat. No. 4,608,356, to Buss et al., a process is disclosed which involves the step of contacting a zeolite L with a platinum solution for a period of less than about three hours. The impregnated zeolite is then calcined in steam.

Published European Application 8602861-A discloses rejuvenating sulfur-containing zeolite catalysts by treating them with a solution of an alkali or alkaline earth metal salt or hydroxide. The catalysts treated by the process disclosed herein are substantially sulfur-free.

None of the cited material teaches or suggests a method for producing a reforming/dehydrocyclization catalyst of the composition shown herein having the specific physical and chemical characteristics.

SUMMARY OF THE INVENTION

This invention is a method for producing a bound Group VIII metal-containing large pore zeolitic reforming/dehydrocyclization catalyst. The preferred zeolites are types L, X and Y. The zeolite, preferably in an amount of at least about 70% by weight, is dispersed in and preferably is bound in an alumina made of boehmitic alumina and an alumina sol. The forming step may be any used in the catalyst forming act but preferably is pelletizing or extruding. The formed, substantially sulfur-free, catalyst is treated with an aqueous solution of an alkali metal or alkaline earth metal oxide or hydroxide. The pH of the solution is between 10.5 and 12.0.

DESCRIPTION OF THE PREFERRED EMBODIMENTS

Figure 1:
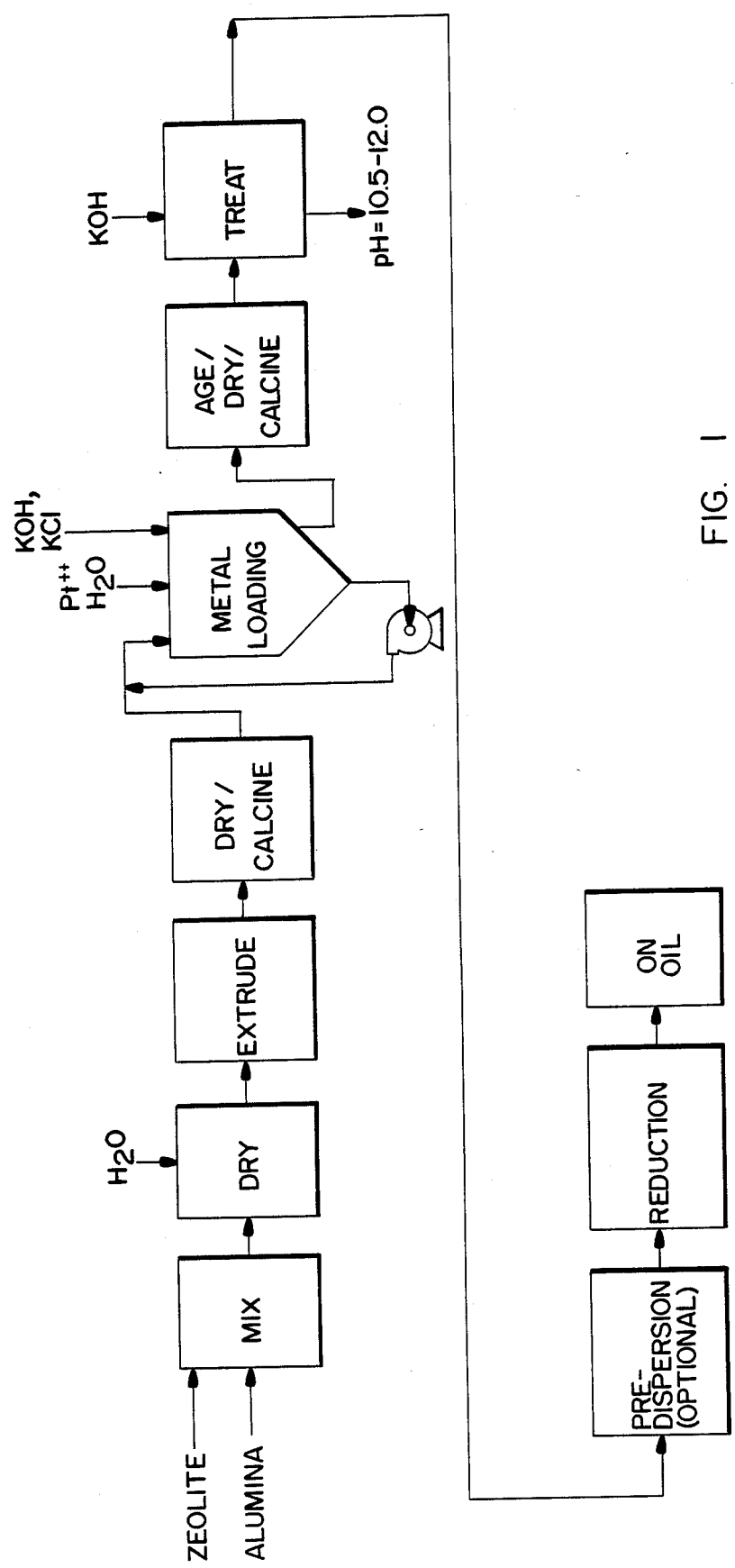
FIG. 1 is a flow chart showing preferred catalyst production and use steps as well as the steps of the invention.

Broadly, the present invention is to a method of producing a Group VIII metal large pore zeolitic catalyst which is suitable for use in reforming or aromatization reactions. The resulting catalyst has high selectivity, high activity, and may also have a wide range of desirable physical characteristics such as superior crush strength, attrition resistance, hexane adsorption, and specific surface area.

Preferred Process for Producing the Catalyst

The method for producing and using the catalyst is illustrated in FIG. 1. The catalyst of this invention may be made in several ways. On way includes first intimately mixing an amount of a boehmitic alumina with an alumina sol; mixing the resulting aggregate with a large pore zeolite; extruding or pelletizing the mixture to produce a formed substrate; drying the substrate; calcining the substrate; impregnating the calcined substrate with a Group VIII metal salt, and calcining the material at a low temperature. Alternatively, the boehmite may be dry-mixed with the zeolite prior to its addition to the sol.

The boehmitic alumina, crystalline alumina monohydrate, has much greater thermal stability than do the other crystalline forms such as the tri-hydrates, e.g., bayerite, norstrandite, or gibbsite, or than does amorphous alumina. Boehmite powders having average particle sizes such as 30 to 150, preferably 40 to 100, and most preferably in the neighborhood of 50 microns may be used.

Sol aluminas (preferably those which have been peptized with an acid which is decomposed to gaseous products upon calcination) is used in the production of the inventive catalyst. Such acids include nitric acid, hydrochloric acid, and acetic acid. Sulfuric acid generally is to be avoided because of the sulfur residue it may leave in the product extrudate. The alumina sol should have an average particle diameter of about 5 to 60, preferably 10 to 30, and most preferably about 20 millimicrons. A combination of preferred boehmite and alumina sol particle diameters reduces the potential for pore blockage of the zeolite by alumina.

The boehmite may be added in an amount to provide from 3 to 21, preferably from 5 to 12 and most preferably 6 to 8, percent by weight (dry basis) of the final catalyst product. The alumina sol may be added in an amount of broadly from 6 to 25 percent by weight (dry basis) of the final catalyst product., but preferably from 18 to 24 and most preferably from 21 to 23 percent by weight. The total of the two aluminas generally will not exceed about 30 percent of the total weight of the catalyst the remainder being the type L zeolite.

The term "large pore zeolite" is meant to include zeolites having pore diameter between 5 and 15 angstroms, preferably between 6 and 10 angstroms. The zeolites may be desirably type X, Y, L or natural faujasite. If type L zeolites are used, they are defined as follows: they are synthetic zeolites which crystallize in the hexagonal system with a characteristic X-ray diffraction pattern obtained from CuK radiation with the major d (A) peak values set out in Table A:

TABLE A 16.1±0.3
7.52±0.04
6.00±0.04
4.57±0.04
4.35±0.04
3.91±0.02
3.47±0.02
3.28±0.02
3.17±0.01
3.07±0.01
2.91±0.01
2.65±0.01
2.46±0.01
2.42±0.01
2.19±0.01

Thus, they share a common zeolitic structure. For purposes of this invention, type L zeolites have a general formula as follows:

where M designates at least one exchangeable cation, n represents the valence of M, y is any value from 0 to about 9, and x is disclosed as 5.2 to 6.9 in U.S. Pat. No. 3,216,789, but may be outside this range provided the X-ray diffraction pattern of the zeolites with $SiO_2/Al_2O_3$ ratios less than 5.2 or greater than 6.9 are applicable to this invention. Preferably, the $SiO_2/Al_2O_3$ ratio may vary between about 2 and about 50. For example, one method of reducing the $SiO_2/Al_2O_3$ ratio involves leaching some of the $SiO_2$ with an alkali metal hydroxide, e.g., KOH, to produce type L zeolite useful in this invention. A more complete description of zeolite L is provided in U.S. Pat. No. 3,216,789. Zeolite L has channel-shaped pores undulating from about 7 to 13 Å in diameter and may occur in the form of cylindrical crystals with a mean diameter of at least 0.5 micron and an aspect ratio of at least 0.5 (as described, e.g., in U.S. Pat. No. 4,544,537, the entire disclosure of which is incorporated herein by reference), as well as in other sizes and shapes.

The type L zeolites are conventionally prepared such that M in the above formula is potassium. See, e.g., U.S.

Pat. Nos. 3,216,789 and 3,867,512. The potassium can be ion exchanged, as is well known, by treating the zeolite in an aqueous solution containing other cations. It is difficult, however, to exchange more than 75% of the original potassium cations, because some cations occupy sites in the zeolite structure which are nearly inaccessible. At least 75% of the exchangeable cations are selected from lithium, sodium, potassium, rubidium, cesium, calcium, and barium. More preferably, the cation is sodium, potassium, rubidium, or cesium, and most preferably potassium, rubidium, or cesium, and most preferably potassium. Optionally, the exchangeable cations may consist of mixtures of the above-named Group IA cations or mixtures of a Group IA cation and barium or calcium cations. These mixtures of cations may be achieved, for example, by treating the zeolite L with an aqueous solution containing a rubidium and/or cesium salt and then washing to remove excess ions. This ion exchange treatment can be repeated to effect further ion exchange, although to a lesser degree.

Type X zeolites are similarly described in U.S. Pat. No. 2,882,244 and type Y zeolites are shown in U.S. Pat. No. 3,130.007.

The Group VIII noble metals which are necessary for catalytic activity are those metals from Group VIII of the Periodic Table of Elements which are selected from osmium, ruthenium, rhodium, iridium, palladium and platinum. The metals may be present in any combination desired. Rhenium, a Group VIIB metal, may also be present so long as at least one Group VIII noble metal is present. The amount of Group VIII noble metal in the catalyst will be an effective amount and will depend, for example, on required catalyst activity, ease of uniform dispersion, and the crystal size of the zeolite. Crystal size limits the effective catalyst loading since highly loaded crystals of zeolite which have a large dimension parallel to the channels could easily plug during operation as the noble metal agglomerates inside the channels. Generally, however, the level of metal present will range from about 0.1 to 6% by weight of the catalyst, preferably 0.1 to 3.5%, and more preferably 0.1 to 2.5%. Furthermore, the amount of metal present is generally from 0.1 to 2.0% by weight of the catalyst, if the average zeolite crystallite size parallel to the channels is greater than about 0.2 micron, and from about 1.0 to 6% by weight if the average zeolite crystallite size parallel to the channels is no greater than about 0.2 micron.

After the zeolite is added to the mixed aluminas, the resulting paste is conveyed to an extruder or pelletizer for formulation of the substrate. The extruder may form an extrudate catalyst having almost any suitable diameter, although 1/16 inch to 3/16 inch is preferred for ease of handling and high exterior surface to volume ratio. Pelletizing is also acceptable but is generally a more expensive procedure.

The extruded catalyst may then be dried in warm air at a temperature of between about 90° C. and 150° C. This drying step may then be followed by a calcination step at a temperature of between about 300° C. and 600° C. preferably between 450° C. and 525° C. Calcination completes the bonding process in "gluing" the zeolite particles into a single coherent mass and apparently provides some interaction between the binding alumina and the zeolite constituent.

The calcined finished catalyst is then treated with an aqueous solution of an alkali or alkaline earth metal oxide or hydroxide. The solution should be at a concentration such that the pH of the solution after it is separated from the catalyst is at a pH of 10.5 to 12.0. The lower pH values in the range are preferred. The solution should have the same cation as is found in the zeolite. i.e., a potassium-exchanged zeolite should be treated with a potassium-bearing solution, a barium-exchanged zeolite catalyst should be treated with a barium-bearing solution. The treated catalyst should be quickly rinsed with water to remove substrated excess solution and dried.

The Group VIII metals, preferably platinum, may then be introduced to the substrate in the manner discussed below.

Metal Loading

After the calcination is complete, the catalyst substrates are allowed to cool. Upon reaching an acceptable temperature, they are impregnated with a Group VIII metal, preferably platinum, to form the final material. If platinum is used, the zeolite preferably is impregnated with an ammino-platinum salt in the "K+-balance" method disclosed in U.S. Pat. No. 4,568,656 to Poeppelmeier et al., the entirety of which is incorporated by reference. The Poeppelmeier process for loading platinum involves contacting the zeolite with an aqueous solution containing a platinum salt and a soluble non-platinum metal salt. The amount of loading solution (defined as A) is in excess of that which is required to fill the total pore volume of the carrier to incipient wetness (defined as X). As applied here, the quantity X is determined by experiment and does not differentiate between the liquid incorporated into the macro-micropores and the intrazeolite channels of the carrier. The excess of solution over that which the carrier can adsorb enables all of the zeolite particles or pellets to be uniformly wetted with the aqueous solution. The presence of an excess of solution permits the loading process to be used on any scale without having to expose the zeolite to excess attrition as a result of mixing, tumbling and other techniques to achieve uniform wetting, which may be needed in other methods such as in the impregnation technique.

The soluble platinum salt used in Poeppelmeier preferably contains a complex having a platinum cation in the plus two oxidation state. This sale may be one or more of a number of water soluble platinum salts including tetraamine platinum (II) chloride monohydrate, tetraamine platinum (II) nitrate, diamine platinum (II) nitrite or dichlorobis (acetonitrile) platinum (II). Substantially all (i.e. at least 90-95%) of the platinum from the solution is adsorbed onto the zeolite provided less than about 10% of platinum by weight of the zeolite is to be loaded on the zeolite. Generally, about 0.1 to 5%, preferably 0.3 to 1.5% of platinum by weight of the zeolite is loaded onto the zeolite.

The amount of non-platinum metal salt (defined as A) is initially present in combination with the platinum source in the loading solution such that after loading, the initial amount of non-platinum metal salt (A) plus the amount of non-platinum metal salt added to the solution by ion-exchange between the platinum source and the zeolite (defined as $A^1$) is present in the loading solution (Z) in a concentration $((A+A^1)/Z)$ equal to the concentration $(A^1/X)$ of non-platinum metal salt added to the solution by ion-exchange between the platinum source and the zeolite ($A^1$) at incipient wetness (X) within a range:

$$\frac{A + A^1}{Z} = \frac{0.3 A^1}{X} \text{ to } \frac{1.2 A^1}{X}$$

This critical balance of the cations prevents the creation of acid sites within the zeolite caused by metal ion migration out of the zeolite into the surrounding solution and being replaced on the substrate by protons upon reduction of the platinum or the clogging of zeolite pores by the presence of excess non-platinum metal ions in the form of a salt, after the drying, calcining and reduction steps. In addition, this balance of non-platinum metal ions in solution provides sufficient ion mobility to allow platinum migration to occur during the aging step and therefore establish a uniform platinum profile throughout each zeolite particle or pellet. The critical balance of cation concentration ranges from $0.3A^1/X$ to $1.2(A^1/X)$, and preferably ranges from $0.5A^1/X$ to $1.0A^1/X$ to prevent acid site creation and prevent the clogging of zeolite pores. The amounts as used in the above equation may involve any consistent unit of quantity (e.g., moles, pounds, grams, etc.).

The aqueous loading solution is carefully formulated by control of the non-platinum metal ion content to minimize any change in the concentration of metal ions in the liquid volume required to fill the total pore volume of the carrier to incipient wetness after the platinum ion concentration reaches an equilibrative minimum. Ideally, this change in non-platinum metal-ion concentration should approach zero. In practice, however, a change up to about −70% to +20% is permissable while still obtaining the uniform catalyst of this invention.

However, the pH of the impregnation solution may be closely controlled during impregnation so that the pH of the solution remains above about 10.5. The pH may be controlled by the addition of KOH. The pH at the end of the impregnation step should be above 10.0 and preferably between about 10.5 and about 12. One advantageous method of including the KOH during noble metal impregnation is via stepwise addition so to maintain the pH in the noted range throughout the noble metal impregnation period as well as at the end.

Without wishing to be bound by theory, it appears that the principal action of KOH treatment of substrates is to add potassium to the $Al_2O_3$ binder according to reaction (1)

$$Al-OH + KOH \rightarrow Al-OK + H_2O \quad (1)$$

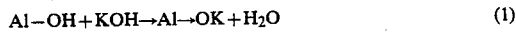

The presence of potassium deactivates the $Al_2O_3$ binder and minimizes the redistribution of Pt on the binder during the redispersion steps mentioned below.

KOH is the preferred method of potassium addition to $Al_2O_3$ binder because of reaction (1). Addition of potassium in the form of KCl may not be as effective due to non-selective deposition on the alumina binder. However, it can easily be carried out by adjusting the concentration of KCl in the solution to the required concentration to give the right amount pore filled KCl. One disadvantage with the KCl method is that the KL zeolite retains excessive KCl in its channels. This may lead to blocking of the zeolite channels during drying.

Due to the reversibility of reaction (1), extensive washing of a KOH treated extrudate is to be discouraged since this results in substantial loss of K from the binder. However, the rate of the reverse reaction in reaction (1) is relatively slow. A quick rinsing may give some benefit by removing the pore filled KOH (without appreciable loss of potassium from the binder) thus reducing pore blocking by the deposited KOH upon drying.

Other alkali or alkaline earth metal compounds such as lithium, sodium, rubidium, cesium, calcium, or barium compounds may be used in a similar fashion. Care must be taken with materials which form insoluble by-products, e.g., Ca or Ba carbonates.

The catalyst is then again dried and calcined at a low temperature in air to prevent substantial agglomeration of the Group VIII metal particles outside the zeolite pores.

Catalysts

The extrudate catalysts produced by the process outlined above have a crush strength (as measured by ASTM D4179-82) greater than about 0.9 pounds per millimeter and preferably greater than 1.0 pounds per millimeter. The attrition resistance (as measured by the ASTD D4058-81) is less than about 3.0 wt.%, preferably less than about 2.75 weight percent. The normal hexane adsorption is greater than 5 weight percent based on the zeolite in the composition. The BET specific surface area of the resulting catalyst extrudate is always greater than about 250 meters squared per gram of extrudate and preferably is more than about 270 meters squared per gram of catalyst.

Catalytic Processes

The catalyst is then ready to be loaded into a reforming or aromatization reactor. Once the catalyst is placed in the reactor, it becomes desirable to perform a pre-dispersion procedure to enhance the activity and long-term stability of the catalyst by performing an oxychlorination procedure. A particularly suitable technique is found in U.S. Pat. No. 4,595,669 to Fung et al. In that procedure, the catalyst is desirably subjected to (a) a wet hydrogen treat at a temperature of about 380° to 540° C., (b) a wet hydrogen chloride treat in a temperature range of from about 450° C. to about 530° C., (c) an oxychlorination at a temperature of from about 480° C. to 520° C. in the presence of 0.05 to 1 percent by volume HCl; (d) a wet oxygen treat in the temperature range from 480° C. to about 520° C. and (e) wet reduction in hydrogen. Significant improvements and initial activity and catalyst activity maintenance can be had by practice of this fresh catalyst pretreatment procedure.

The catalyst may then be subjected to the desired chemical reaction. The catalyst may be used in a reforming process, but it is not limited to use in conventional reforming of naphthas derived from petroleum or other sources od hydrocarbons and boiling in the range of about 71° to 216° C., but may also be used to produce the corresponding aromatic products from any reactant organic compound containing at least six carbon atoms, including those which contain a reactant functional group. Examples of reactant compounds suitable for this purpose include paraffins such as n-hexane, h-heptane, n-octane, n-nonane, etc., preferably naphthas boiling in the range of between 71° and 216° C. Preferred reactions herein are the aromatization of n-hexane to benzene, and heptane to toluene, and n-octane to ethylbenzene and/or xylenes. The compound n-hexane may be present in the feed or produced by isomerization of methylpentanes and methylcyclopentane. Since the catalyst is largely monofunctional and does not promote isomerization without cyclization, feed compounds such a dimethylbutanes are not effected.

The reforming process described above may be carried out under general reforming conditions in the presence of hydrogen at a moderate pressure to favor thermodynamically the aromatization reaction. For the traditional reforming of paraffins to aromatics the temperature depends on the particular paraffin but for acceptable rate and selectivity preferably ranges from between about 400° to 550° C., more preferably from 450° to 520° C. at pressures of about 200kPa to 5mPa, more preferably about 500kPa to 5mPa. If the temperature is much below about 400° C., the yield of product is quite low, and if the product substantially exceeds about 550° C., other reactions occur which also diminish the yield of product. The liquid hourly space velocity of this reforming reaction is preferably from about 0.5 to 20 w/w/hr, more preferably from 1 to 10 w/w/hr, and the hydrogen to reactant molar ratio is preferably from 2 to 20, more preferably from about 4 to 10.

Once the catalyst is partially or completely deactivated during the normal course of a run by, e.g., coking or agglomeration of the Group VIII noble metal catalyst particles, it becomes necessary to regenerate the catalyst by removing the coke, redispersing the Group VIII metals and reducing the metals so-dispersed into a catalytic form. An advantageous method of regenerating this catalyst may be found in U.S. Pat. No. 4,595,668, the entirety of which is incorporated by reference. The process generally involves the removal of the coke by oxidation or by the water-gas shift reaction. After the coke-removal step, the catalyst may again be treated with the alkali metal or alkaline earth metal oxide or hydroxide solution as outlined above. This step is shown as "Treat No. 2" in the Figure. The regeneration process may then be continued via the oxychlorination of the Group VIII metals to disperse them into the zeolitic pores, the stabilization of the thus-dispersed metals by breaking up the Group VIII-O-Cl complex (preferably by a wet-oxygen treat), and the reduction of the metal in the zeolite. The treatment of the formed catalyst by using the pH-controlled washing step noted above is believed to provide substantially greater catalyst performance both in the redispersed forms than when the pH is allowed to drop below 10.5.

EXAMPLE

The following will illustrate the invention through specific examples. It should be understood that this example is provided only to illustrate the present invention and is not to be intended as limiting on the invention in any way.

EXAMPLE 1

Zeolite extrudates were impregnated using tetraammine platinum II chloride ($Pt(NH_3)_4Cl_2.H_2O$) and KOH/KCl solution. The extrudates contained about 71.8% KL zeolite and 28.2% total $Al_2O_3$ binder. The extrudates were treated with a KOH solution so that the resulting loading solution was either above or below a pH of 10.5.

Each of the catalysts was then loaded into an aromatization reactor. The aromatization was carried out at 510° C., 100 psig, 20 w/w/hr, $H_2$/oil=6; and with 3-methyl pentane ("3MP") as the feed. The benzene yield was measured. Coke on the catalysts was them removed by admission of oxygen to the reactor. The catalysts were then regenerated using an oxychlorination procedure. The benzene yield was again measured. The respective yields are shown in the table:

TABLE 1

| | Benzene Yields @ 12 hours | |
|---|---|---|
| | Treatment pH = 9.86 | Treatment pH = 10.77 |
| Fresh Catalyst | 31.5 | 30.0 |
| Redispersed Catalyst | 22.5 | 31.0 |

This Example demonstrates that the pH controlled treating step shows clear benefit to the activity of extruded catalysts even after they are regenerated.

While the present invention has been described with reference to various specific embodiments and examples, this application is intended to cover changes and substitutions which would be apparent to those having ordinary skill in this art without departing from the spirit of the appended claims.

What is claimed is

1. A method of treating a zeolite catalyst comprising the steps of:
   contacting a formed zeolite, substantially sulfur-free, catalyst containing a large pore zeolite, at least one Group VIII metal, at least one alkali metal or alkaline earth metal in an alumina-bearing binder with an aqueous solution of the hydroxide or oxide of the alkali metal or alkaline earth metal such that the solution, upon separation from the formed zeolite catalyst has a pH between 10.5 and 12.0,
   reducing the Group VIII metal, and
   dispersing the Group VIII metal using oxychlorination.

2. The method of claim 1 wherein the large pore zeolite is selected from types X, Y, L and faujasite.

3. The method of claim 2 wherein the large pore zeolite is type L.

4. The method of claim 1 wherein the alkali or alkaline earth metal is selected from sodium, potassium, barium and calcium.

5. The method of claim 4 wherein the alkali or alkaline earth metal is selected from potassium and barium.

6. The method of claim 3 wherein the alkali or alkaline earth metal is potassium.

7. The method of claim 6 wherein the formed catalyst is an extrudate.

8. A method for treating a zeolite catalyst comprising the steps of:
   contacting a formed, substantially sulfur-free, catalyst containing a large pore zeolite, at least one alkali metal or alkaline earth metal, and platinum in an alumina-bearing binder with an aqueous solution of the hydroxide or oxide of the alkali metal or alkaline earth metal such that the solution, upon separation of the formed zeolite catalyst has a pH between 10.5 and 12.0,
   reducing the platinum,
   dispersing the platinum metal using oxychlorination.

9. The method of claim B wherein the substrate is an extrudate.

10. The method of claim 8 wherein the substrate is in the form of a pellet.

11. The method of claim 9 wherein the alkali or alkaline earth metal compound is selected from barium or potassium oxides or hydroxides.

12. The method of claim 9 wherein the alkali or alkaline earth metal compound is at least potassium hydroxide.

13. A method for producing a stabilized, extruded type L zeolite catalyst comprising the steps of:
producing a formed substrate by extruding a mixture of type L zeolite and the remainder a mixture of boehmite and alumina sol,
drying and calcining that formed substrate,
impregnating the formed substrate with an aqueous solution of a platinum salt, potassium chloride, and potassium hydroxide to produce a formed catalyst,
drying and calcining the formed catalyst,
contacting the formed catalyst with an aqueous potassium oxide or hydroxide solution such that the solution, upon separation from the formed catalyst, has a pH between 10.5 and 12.0, and
dispersing the platinum metal by oxychlorination.

* * * * *